United States Patent [19]

Harshman et al.

[11] 4,296,773
[45] Oct. 27, 1981

[54] HYDRAULIC SELECTOR VALVE HAVING JOY STICK CONTROL

[75] Inventors: Ronald W. Harshman, Greencastle; Lynn A. Dietrich, Chambersburg, both of Pa.

[73] Assignee: Walter Kidde & Company, Inc., Clifton, N.J.

[21] Appl. No.: 11,762

[22] Filed: Feb. 12, 1979

[51] Int. Cl.³ ............................................. F16K 29/00
[52] U.S. Cl. ....................................... 137/312; 91/522; 91/465; 137/636.2; 137/868
[58] Field of Search ................. 137/636, 636.2, 636.3, 137/867, 868, 312; 91/522, 523, 521, 465

[56] References Cited

U.S. PATENT DOCUMENTS

| | | | |
|---|---|---|---|
| 957,286 | 5/1910 | Wilson | 251/324 |
| 2,430,808 | 11/1947 | Eaton | 91/521 |
| 2,580,731 | 1/1952 | Cochin | 137/868 |
| 2,794,609 | 6/1957 | Perry | 137/636 |
| 2,958,233 | 11/1960 | Johnson | 137/636.2 |
| 3,496,796 | 2/1970 | Alpers | 137/636.2 |
| 3,589,242 | 6/1971 | Peterson | 137/636 |
| 3,707,984 | 1/1973 | Bantz | 137/312 |
| 3,766,944 | 10/1973 | Distler | 137/636.2 |
| 3,918,496 | 11/1975 | Byers, Jr. | 137/636.3 |
| 4,080,992 | 3/1978 | Niederer | 91/465 |
| 4,184,512 | 1/1980 | Pignolet | 137/868 |

*Primary Examiner*—Abraham Hershkovitz
*Attorney, Agent, or Firm*—Brady, O'Boyle & Gates

[57] ABSTRACT

A manually operable hydraulic selector valve includes a plurality of two-way spool valves which are normally closed and are selectively shiftable individually or in pairs by a joy stick operator to open positions whereby motive fluid can be delivered to a given instrumentality such as the jack cylinder of a construction crane outrigger arm. The joy stick carries a conical disc which cammingly engages drive pin extensions of the individual spool valves. A positive stop for the conical disc is afforded by contact of the disc with the mounting plate of the selector valve. The selector valve is employed with an associated two-way directional control valve.

3 Claims, 5 Drawing Figures

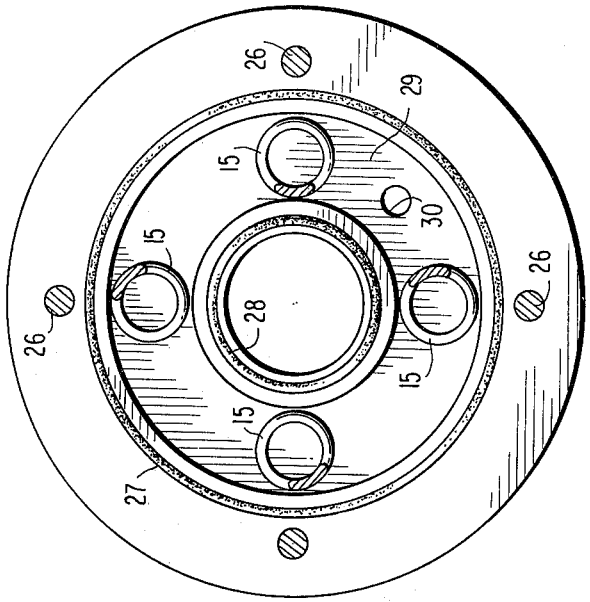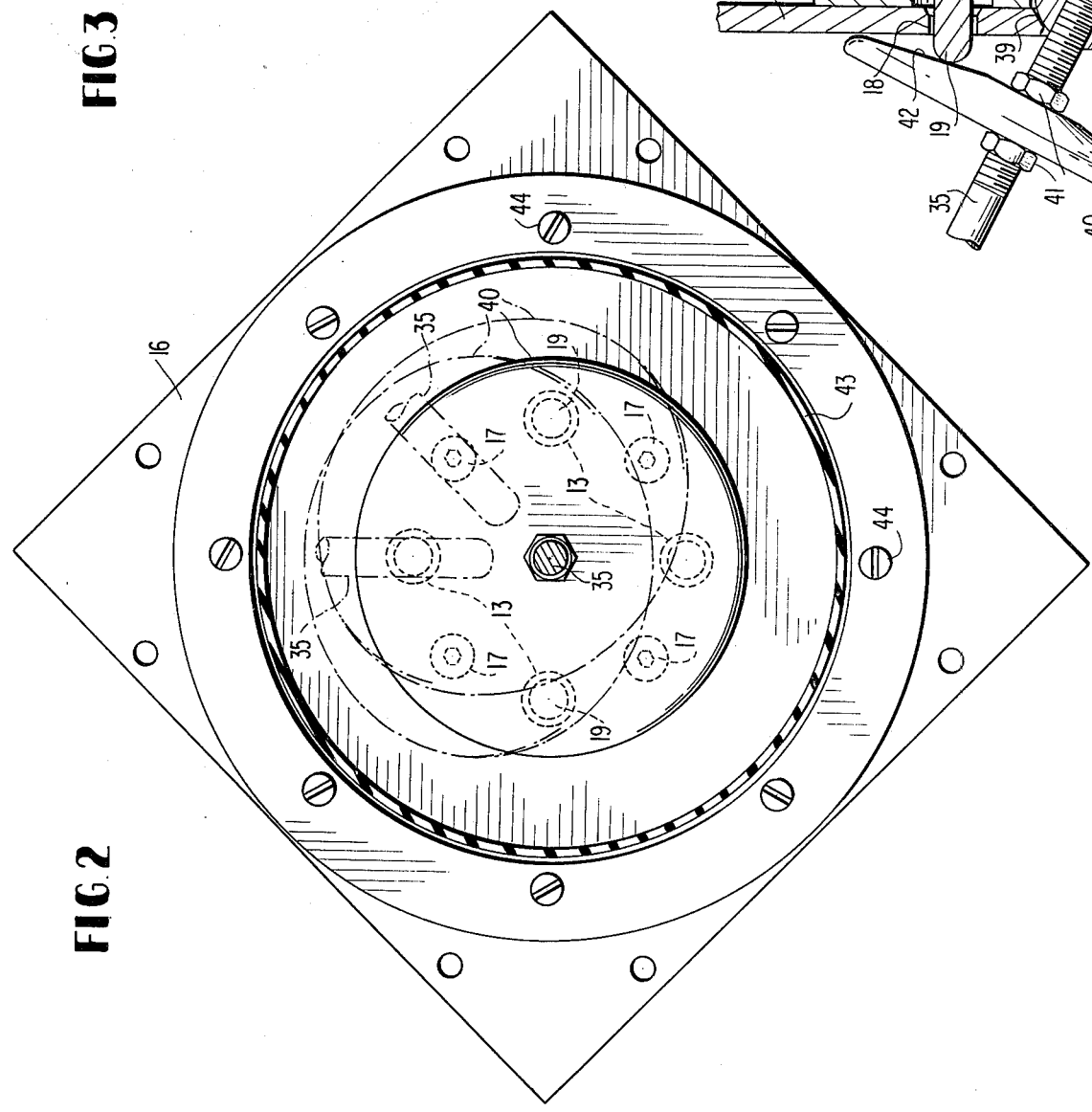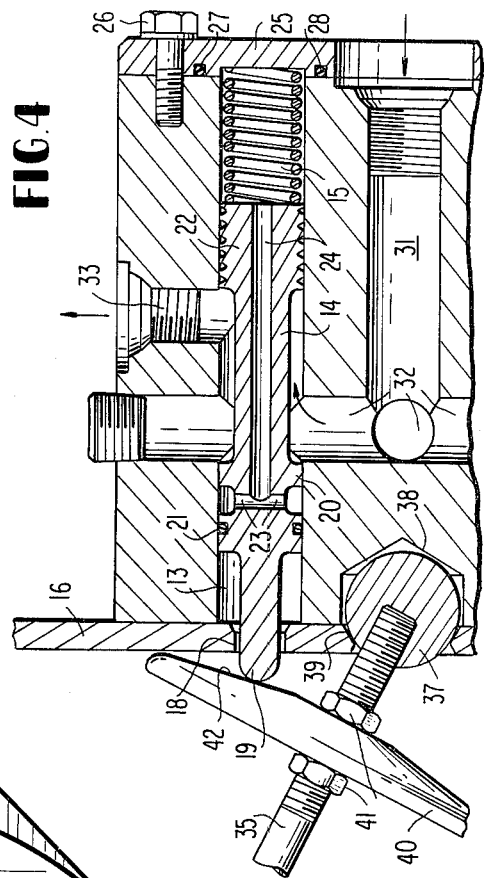

HYDRAULIC SELECTOR VALVE HAVING JOY STICK CONTROL

BACKGROUND OF THE INVENTION

The objective of this invention is to provide a simplified, compact and operationally convenient selector valve having a universally pivoted joy stick control handle whereby an operator can deliver motive fluid selectively to remove devices for individual operation or operation in pairs. While the invention has the capability of wide utility, it is ideally suited for controlling the operation of outrigger jack cylinders on construction cranes and similar equipment. Such cranes may have four outrigger arms, two on each side of the crane, and each equipped with a ground-engaging jack or leg which is extended and retracted at proper times under control of a hydraulic cylinder. In such an application, the present invention will embody in a single selector valve assembly four two-way spool valves which are biased to a closed position and are easily shifted, one at a time or in selected pairs, to an open position by the use of a joy stick having a ball swivel connection with the valve casing and carrying a conical disc which cammingly engages extensions of the individual valve spools exteriorly of their casings to drive them toward their open positions.

The construction of the selector valve allows the use of only one low pressure fluid seal on each valve spool, and provision is made in the valve for draining all of the spool valve bores through a common drain passage and port at one end of the assembly and for venting the valve spool. Another unique feature of the device tending to make it foolproof and damage-proof during operation is an arrangement whereby the cover or mounting plate at one end of the valve casing forms a positive stop surface for the peripheral portion of the conical disc carried by the joy stick operator or lever. This arrangement limits the swing of the joy stick in all directions.

Other features and advantages of the invention will become apparent to those skilled in the art during the course of the following description.

BRIEF DESCRIPTION OF THE DRAWINGS

FIG. 2 is a transverse vertical section taken on line 2—2 of FIG. 1.

FIG. 3 is a similar section taken on line 3—3 of FIG. 1.

FIG. 4 is a fragmentary vertical section similar to FIG. 1 showing one valve spool in its full open position under influence of the joy stick whose conical disc is at one limit of its movement.

DETAILED DESCRIPTION

Figure 1:
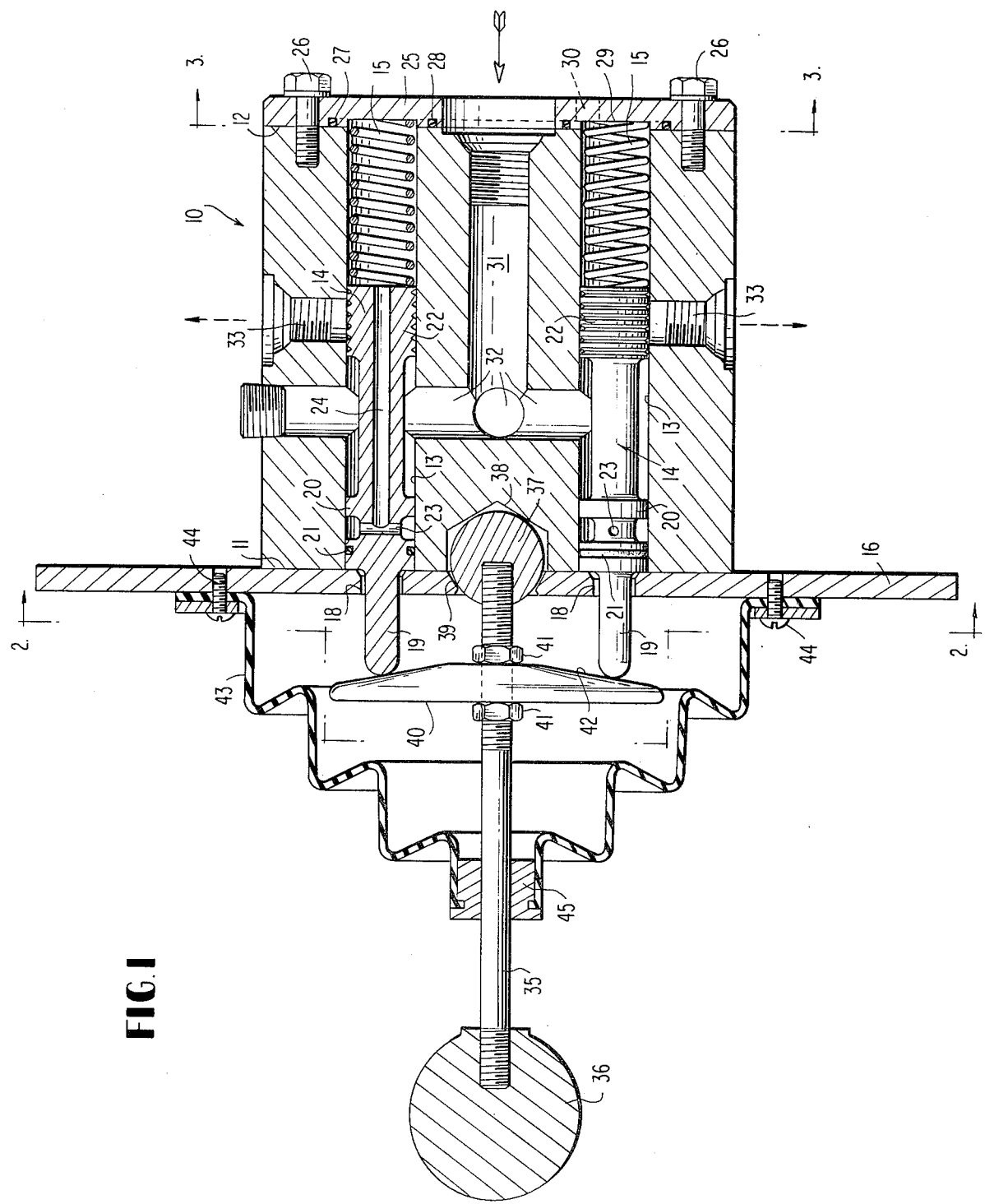
FIG. 1 is a central vertical longitudinal section through a hydraulic selector valve embodying the invention.

Referring to the drawings in detail, wherein like numerals designate like parts, the numeral 10 designates a unitary valve body or casing having opposite flat parallel end faces 11 and 12. In the embodiment illustrated, the valve casing 10 has four equal diameter circumferentially equi-distantly spaced through bores 13 which receive a corresponding number of valve spools 14 to provide on the selector valve four independently operable two-way spool valves.

The spools 14 are each biased to a closed position by a coil spring 15 disposed in one of the bores 13 in opposition to one end of the spool. Each spool 14 is positively arrested in its movement away from the spring 15 by engagement thereof with a flat cover plate 16 lying against the valve casing end face 11 and fixedly secured against this face by circumferentially spaced cap screws 17. The cover plate 16 has openings 18 formed therethrough to receive reduced diameter rounded end extensions 19 of each individual valve spool 14.

Inwardly of the clearance openings 18 each valve spool 14 has a first land 20 which carries a single low pressure ring seal 21 in sealing engagement with the adjacent bore 13. A second land 22 at the other end of each spool 14 is grooved on its periphery to eliminate chattering and for balanced operation of the valve as well as other beneficial reasons known in the art. Each valve spool 14 is provided near the center of the land 20 with radial vent passages 23 communicating with a center longitudinal vent passage 24 of the spool, the latter passage opening through the end of the spool 14 adjacent to the spring 15. Any fluid which leaks past the land 20 will be vented and drained through the passages 23 and 24.

An end cover plate 25 for the valve casing 10 is secured thereto by screws 26 and contains end face seals 27 and 28 outwardly and inwardly of the bores 13. A shallow annular drain collector recess 29 common to the several bores 13 is formed in the interior face of end cover plate 25, and this collector recess leads to a single drain port 30 formed in the end cover plate. By virtue of this arrangement, the valve spools are vented at each end to eliminate the possibility of hydraulic blockage during operation.

The valve casing 10 has a central axial hydraulic fluid supply port 31 adapted for coupling with a suitable fitting, not shown, and leading forwardly to four radial circumferentially spaced ports 32 which intersect the four bores 13 in the regions of the undercut portions of the spools 14 between their lands 20 and 22.

Hydraulic fluid delivery ports 33 lead radially outwardly from the several bores 13 and are also adapted for coupling with hydraulic fittings, not shown. The four radial ports 33 at proper times when the two-way spool valves are forced open deliver motive fluid to remotely located devices to be operated such as the aforementioned outrigger jacks designated at 34 in FIG. 5.

The selector valve comprises, as one of its major features, a joy stick controller or lever 35 having a hand knob 36 and being coupled with the valve casing 10 for universal swinging movement through a ball head 37 on the inner end of the joy stick 35 having swiveled engagement in a cavity 38 formed in the end face 11 of the valve casing at its longitudinal center line. The swiveling ball head is retained in the cavity 38 by the cover plate 16 which has an opening 39 to engage the ball head and hold it captive while allowing it to swivel freely in any direction.

The joy stick 35 carries a spool valve actuating disc 40 near and outwardly of the plate 16, which disc is adjustable axially on the joy stick by means of threaded adjusting and locking nuts 41 received on a screw-threaded portion of the joy stick. The interior face 42 of the disc 40 is conically tapered on a rather shallow angle and this surface is symmetrically arranged around the joy stick and cammingly and slidably engages the rounded ends of spool valve extensions 19. The disc 40 and associated elements is enclosed inside of a water tight rubber boot 43 having its base flange secured by screws 44 to the outer face of plate 16. A boot bushing 45 has its bore receiving the joy stick 35, as shown.

FIG. 4 illustrates how the joy stick 35 can be operated to shift any selected valve spool 14 from the normally closed position of FIG. 1 to the full open position of FIG. 2. It is also possible to swing the joy stick in such a way that a selected pair of the circumferentially spaced two-way valves may be simultaneously opened. Thus, the invention has considerable flexibility. FIG. 2 illustrates the orbital movement of the valve actuating disc 40 carried by the universally swingable joy stick. As shown in FIG. 4, the marginal edge portion of the rigid disc 40 will contact the plate 16 as a positive stop after movement of any valve spool 14 to the full open position. This prevents manual overriding of the valve spools and prevents possible damage to the system. The same disc 40 thus serves the twofold purpose of operating the spool valves against their return springs 15 and of forming a positive step for the selector valve joy stick. The construction is very compact, sturdy and durable, requires only one part adjustment and is highly convenient to use.

Figure 5:
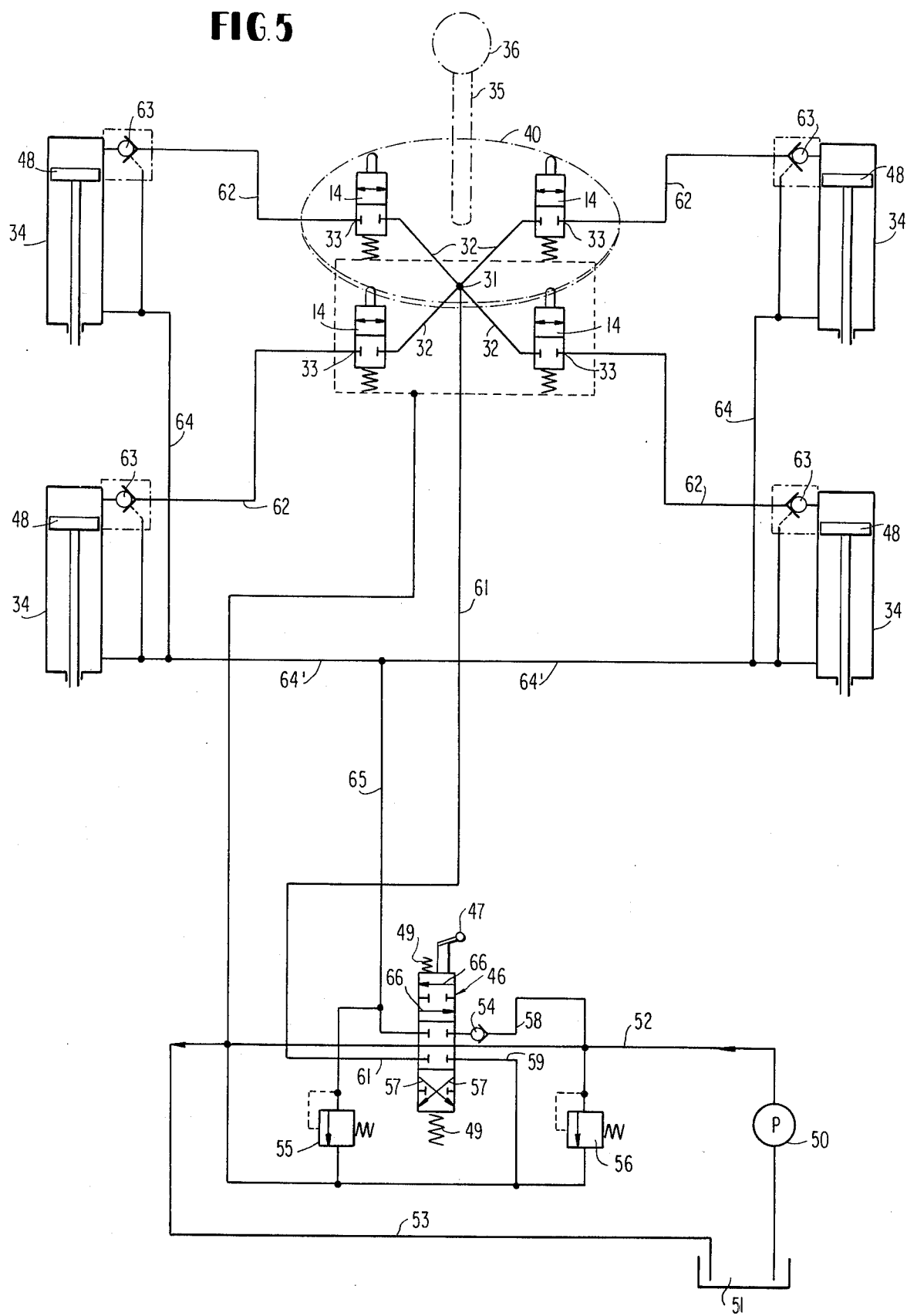
FIG. 5 is a hydraulic schematic of the selector valve in association with four jack cylinders and a directional control valve.

As shown in FIG. 5, the selector valve is used in conjunction with a separate directional control valve 46 having an operating handle 47. The selector valve and the valve 46 are connected in series and the operation of the system requires the use of two hands by the machine operator, such as a crane operator, to extend or retract the pistons 48 of outrigger jacks 34 or the like one at a time or in pairs by use of the joy stick 35. The two-way directional control valve 46 has a neutral position shown in FIG. 5 and is biased into this position by spring means 49. In FIG. 5, the four selectively operable spools 14 of the joy stick operated selector valve are in their normally closed positions corresponding to FIG. 1.

Under these conditions, a pump 50 circulates hydraulic fluid from a reservoir 51 across the directional valve 46 through a line 52 and back to the reservoir to another line 53 in a continuous loop. Also associated with the directional valve 46 are a one-way check valve 54 and conventional bypass valves 55 and 56 which are biased toward off or non-bypass positions.

When the crane operator wishes to extend the outrigger jacks selectively one at a time or in pairs by means of the joy stick arrangement fully described above, he will simultaneously utilize the handle of valve 46 with his other hand and pull this handle toward the selector valve in the illustration of FIG. 5. This will cause the ports 57 of the directional valve 46 to register with the hydraulic lines 58 and 59 and 60 and 61 of the system, whereby hydraulic fluid being delivered by the pump 50 will flow through the line 61 to the selector valve supply port 31, and then through the internal ports 32 to a single delivery port 33, FIG. 1, or a pair of such delivery ports, depending on how the joy stick 35 is shifted. In any event, motor fluid will then be delivered through one or a pair of lines 62 and through conventional check valves 63 of the system to the ends of the jack cylinders where the jack pistons 48 will be extended by hydraulic pressure. Simultaneously, hydraulic fluid from the far ends of the jack cylinders will be returned through lines 64 and 64' to a common return line 65 connected to the line 60, and finally from this line through the return port 57 of the directional valve 46 while the operator is still holding the directional valve in the extend position.

To retract the jack pistons 48 selectively, individually or in pairs, the selector valve joy stick 35 is operated with one hand in the identical manner to shift one or a pair of the valve spools 14 to the open position, FIG. 4. Simultaneously, with the other hand, the handle 47 is pushed to move the retract ports 66 of valve 46 into registry with lines 58 and 59 and 60 and 61. Motive fluid will now pass through lines 60, 65, 64' and 64 to the ends of jack cylinders 34 and will act on the selected one or two of the pistons 48 to retract them, while fluid is returned through line or lines 62, port 31, line 61 and line 59. Once again, while the invention has been described in connection with outrigger jacks of a construction crane, it should be apparent to anyone skilled in the art that the joy stick controlled selector valve and the system shown in FIG. 5 are applicable in many situations requiring selective operation of machine parts and the like through extension or retraction of rams or other actuators.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

We claim:

1. A selector valve comprising a valve body having plural spaced parallel bores, motive fluid inlet passage means leading to said bores and plural motive fluid delivery ports corresponding in number to said bores and leading from the bores, a valve spool positioned in each said bore of the valve body and being biased to a closing position in relation to the adjacent delivery port and having an extension projecting exteriorly of the valve body at one end thereof, a joy stick controller for said valve spools and having a universal swiveled connection with the valve body at said one end and between said bores, an end cover plate for the valve body at the end thereof remote from said joy stick controller and having an annular collector recess in its interior face in registration with said bores, said cover plate having a drain port in communication with said collector recess, and an actuating disc mounted on said joy stick controller and cammingly engaging all of said valve spool extensions and movable with the joy stick controller to selectively shift a single valve spool or a pair of such spools to an open position in relation to a single delivery port or a pair of such ports of the valve body.

2. A selector valve as defined in claim 1, and biasing springs for the valve spools in said bores and having corresponding ends seated in said collector recess.

3. A selector valve as defined in claim 1 and each valve spool having an axial vent passage opening through one end of the spool remote from said joy stick controller and having a radial vent passage near the other end of the spool in communication with said axial vent passage.

* * * * *